Figure 1:
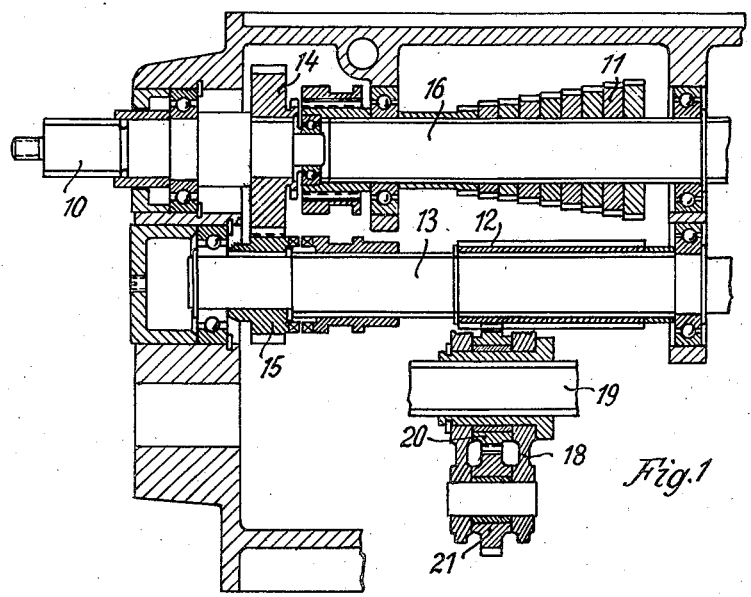

March 3, 1942.   H. HAUTSCH   2,274,958

MACHINE DRIVE AND CONTROL THEREFOR

Filed May 15, 1940   2 Sheets-Sheet 1

Inventor
HANS HAUTSCH,
By
Beau, Brooks, Buckley & Beau.
Attorneys

March 3, 1942.  H. HAUTSCH  2,274,958
MACHINE DRIVE AND CONTROL THEREFOR
Filed May 15, 1940  2 Sheets-Sheet 2

Inventor
HANS HAUTSCH,
By
Beau, Brooks, Buckley & Beau.
Attorneys

Patented Mar. 3, 1942

2,274,958

UNITED STATES PATENT OFFICE 2,274,958

MACHINE DRIVE AND CONTROL THEREFOR

Hans Hautsch, Meuselwitz/Thur, Germany

Application May 15, 1940, Serial No. 335,337
In Germany May 17, 1939

3 Claims. (Cl. 74—348)

This invention refers to drives for machine tools, e. g. centre lathes or the like. It consists in a new and improved control device for such drives and more particularly in a control mechanism which is oil-tight and allows a simple and foolproof operation thereof.

With such drives, the rotating power is transmitted for example, either from change-wheel spindle over a cone of gears and tumbler gear or swing-gear to an intermediate shaft, alternatively over the intermediate shaft and swing-gear onto the cone of gears. Herewith various ratios can be put into operation by means of the swing-gear carrying intermediate gears, which swing gear can be slid correspondingly and axially on a countershaft and may be swung into gear with the cone of gears.

The disadvantage with certain control mechanisms for drives of this type is that their manipulation is not simple enough, and that the control levers do not permit the gear casing to be closed completely, and to be made dust and dirt proof. Lubrication with this method of construction is imperfect, and difficulty is experienced in letting the mechanism run totally oil-immersed.

This present invention appertains to an improved controlling device for such drives free from the aforementioned disadvantages; that is, it permits a totally enclosed feed-box to be constructed, which in regard to structure and operation is technically of such simple form that a long working life is assured.

More in detail, the invention resides in providing two rotating members on the front of the gear-box which members serve to set the swing-gear, arranged slidably but non-rotatably on a countershaft, into its individual stages against the block; the rotation actuating shafts of said members lead into the gear-box through oil-tight bearings, and over intermediate gearing operate on the one hand, swivelling of the countershaft, and on the other hand, sliding of the swing-gear on said shaft.

Thus, due to the fact that the control of the swing-gear is controlled by a rotating motion even as regards the shifting thereof, no extra recessing of the gear casing is necessary to make way for longitudinal movements, whilst the sealing of said shafts entering the casing offers no difficulties whatsoever.

The practical construction of this invention can be so arranged that the shafts within the casing are each fitted with a pinion, one of which engages with a toothed rack connected to the swing-gear shifter-fork, and the other with a worm drive that revolves the countershaft.

And still further it is an object of this invention to fit one of the two shafts concentrically within each other, in order to obtain a compact and distinctive structure, utilizing the outer shaft, on which a longer control handle may be mounted to effect axial movement of the tumbler gear.

The above and other characteristics of the invention will appear from the drawings which show a practical example of the invention and in which Fig. 1 is a front view (longitudinal section) of the complete drive.

Figure 2:
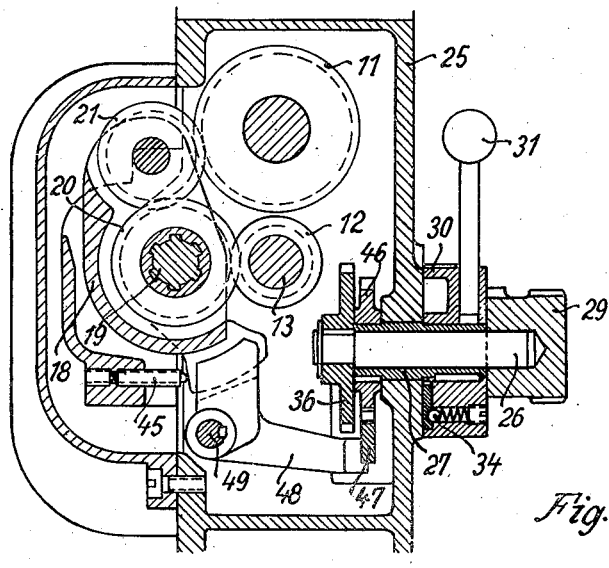
Figure 3:
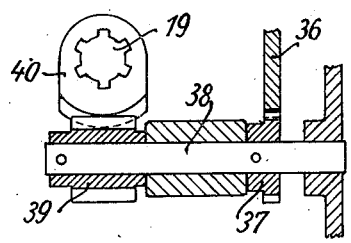
Figure 4:
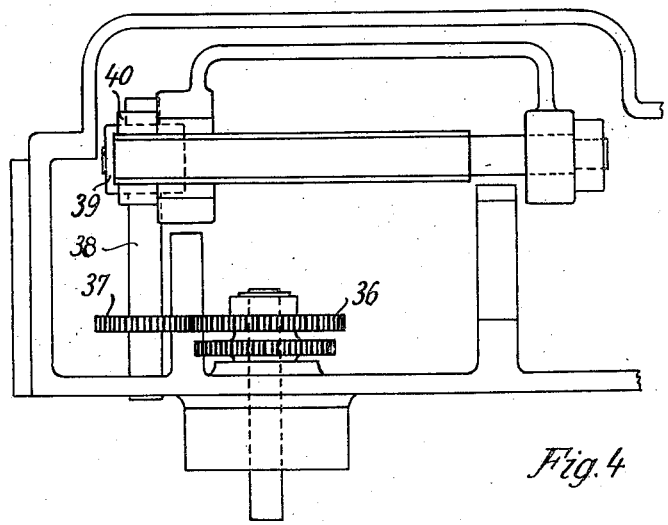
Figure 5:
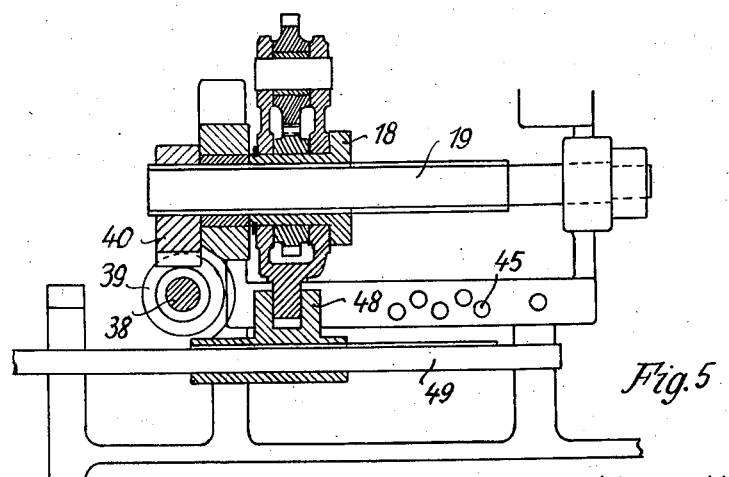

Fig. 2 shows a side elevation, partly in section, of the arrangement according to invention, and Figs. 3–5 illustrate individualities of the controlling mechanism according to invention.

Referring now to Fig. 1, 10 denotes the change wheel spindle, from which the rotation is transmitted, either over cone of gears 11 and pinion 12 to shaft 13, or over pinions 14, 15 to shaft 13, pinion 12, and thence to cone 11 on shaft 16. Connection between cone 11 and pinion 12 is made by means of a tumbler gear or swing-gear 21 mounted in tubular frame 18, which is slidable but non-rotatable on countershaft 19, and which carries intermediate gear 20. Turning of shaft 19 allows this latter gear 21 to engage with an appointed gear wheel of cone 11, whilst the former (20) engages with pinion 12.

In order to be able to move the swing-gear axially on countershaft 19, and to bring it into contact with block 11, an arrangement conforming to the invention as shown in Fig. 2 will have to be fitted. In Fig. 2 the front of gear casing 25 is shown fitted with shaft 26 and a concentrically arranged hollow shaft 27, together forming an oil-tight joint with the gear casing. Shaft 26 is fitted with turn-knob 29, and shaft 27 is connected to drum 30, e. g. keyed, and adjustable by means of hand lever 31 to the respective wheels on block 11 through ball stops 34.

Turn-knob 29 and shaft 26 serve to swivel the swing-gear frame 18 toward and away from the block 11, and for this purpose the shaft is fitted on the inside of the gear casing with pinion 36 that meshes, as shown in side elevation Fig. 3 and plan view Fig. 4, with pinion 37. Spindle 38 of pinion 37, also located within the gear casing, is fitted with worm 39 that meshes with worm-wheel segment 40 on shaft 19.

According to the direction rotation of turn-knob 29 the countershaft 19 is turned in one or the other direction, and therewith swing-gear frame 18 on this shaft is brought toward or away from cone 11. When approaching the swing-gear to the cone the extent of its swivelling motion is determined by stops 45 (Figs. 2 and 5) attributed to the individual wheels on block 11, and which can for example be adjusted by screws.

From Fig. 2 it may be seen that in order to shift swing-gear element 18 axially on countershaft 19, hollow shaft 27 has a gear wheel 46 meshing with toothed rack 47. This rack 47 is slidable and connected, e. g. screwed, to fork 48, which is slidable on shaft 49 and engages as shown in Fig. 5, with element 18.

Now when lever 31 is operated, wheel 46 over rack 47 moves fork 48 on shaft 49, and therewith swing-gear element 18 on shaft 19. The distance shifted is regulated into determined stages by means of graduated drum 30.

It will be found advantageous to arrange the mechanism operated by turn-knob 29 so that a left-hand rotation disengages, and a right-hand rotation engages the swing-gear. Now when it is desired to engage the drive with a certain ratio, knob 29 must first be turned to the left; then, the desired gear is set with lever 31, and a right-hand turn of knob 29 re-engages the swing-gear.

What I claim is:

1. In a drive for a machine tool or the like, a tumbler shaft and a tumbler gear frame splined thereon, control means for the tumbler gear comprising a lever and a knob respectively mounted upon outer and inner concentric shafts, a shifter element engaging said tumbler gear frame for effecting translation of the latter axially upon said tumbler shaft, said shifter element comprising a rack geared to the outer of said concentric shafts, and the inner of said concentric shafts being geared to said tumbler shaft for effecting rotative motion thereof, whereby turning of the knob will effect rotative translation of the tumbler gear frame and turning of the lever will effect translation thereof axially of the tumbler shaft.

2. In a drive for a machine tool or the like, a tumbler shaft and a tumbler gear frame mounted thereon for rotative movement therewith, control means for the tumbler gear comprising outer and inner concentric shafts, a shifter element mounted for movement on a guide substantially parallel to the tumbler shaft, said shifter element engaging a part carried by the frame for effecting translation of the latter along the axis of the tumbler shaft, said shifter element comprising a rack geared to the outer of said concentric shafts, and the inner of said concentric shafts being geared to said tumbler shaft for effecting rotative movement of the latter.

3. In a drive for a machine tool or the like, a cone of gears and a tumbler gear for meshing engagement therewith, a tumbler shaft and a frame for the tumbler gear mounted on said shaft for rotative movement therewith, stop means and a part of said frame engageable therewith for limiting the degree of movement of the tumbler gear about the axis of the tumbler shaft into meshing engagement with the gears of said cone, control means for the tumbler gear comprising inner and outer concentric shafts, the inner of said concentric shafts being geared to the tumbler shaft to effect rotational movement of the latter, and a shifter element mounted for movement on a guide substantially parallel to the tumbler shaft, said shifter element having a rack geared to the outer of said concentric shafts and engaging a part carried by the frame for effecting translation of the latter along the axis of the tumbler shaft.

HANS HAUTSCH.

CERTIFICATE OF CORRECTION.

Patent No. 2,274,958. March 3, 1942.

HANS HAUTSCH.

It is hereby certified that error appears in the printed specification of the above numbered patent requiring correction as follows: Page 1, second column, line 28, for "tubular" read --tumbler--; and line 55, after "direction" insert --of--; and that the said Letters Patent should be read with this correction therein that the same may conform to the record of the case in the Patent Office.

Signed and sealed this 28th day of April, A. D. 1942.

(Seal)

Henry Van Arsdale,
Acting Commissioner of Patents.